(12) United States Patent
Saito et al.

(10) Patent No.: US 8,702,150 B2
(45) Date of Patent: Apr. 22, 2014

(54) TONNEAU COVER APPARATUS

(75) Inventors: Kazunori Saito, Yokohama (JP);
Takahiro Yajima, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 40 days.

(21) Appl. No.: 13/350,955

(22) Filed: Jan. 16, 2012

(65) Prior Publication Data
US 2012/0181813 A1  Jul. 19, 2012

(30) Foreign Application Priority Data

Jan. 17, 2011  (JP) ................................. 2011-007190

(51) Int. Cl.
*B60P 7/02* (2006.01)
(52) U.S. Cl.
USPC .................. 296/100.04; 296/136.03
(58) Field of Classification Search
USPC ............. 296/100.01, 100.04, 100.15, 136.03, 296/136.04, 141, 142, 143; 49/380, 414, 49/415, 425, 436, 442, 453; 160/24, 160/370.22, 263
See application file for complete search history.

(56) References Cited

U.S. PATENT DOCUMENTS

| | | | | |
|---|---|---|---|---|
| 3,099,916 A | * | 8/1963 | Rosenbaum | 160/323.1 |
| 5,676,415 A | * | 10/1997 | Ament et al. | 296/37.16 |
| 5,813,449 A | * | 9/1998 | Patmore et al. | 160/370.22 |
| 5,961,172 A | * | 10/1999 | Ament et al. | 296/37.16 |
| 6,125,908 A | * | 10/2000 | Ament et al. | 160/323.1 |
| 7,337,823 B2 | * | 3/2008 | Wieczorek et al. | 160/24 |
| 2004/0160075 A1 | * | 8/2004 | Ehrenberger | 296/37.1 |
| 2007/0084572 A1 | * | 4/2007 | Davenport et al. | 160/370.22 |

FOREIGN PATENT DOCUMENTS

| | | | | |
|---|---|---|---|---|
| JP | 08183393 | A | * | 7/1996 |
| JP | 2004-175207 | | | 6/2004 |
| JP | 2009-23438 | | | 2/2009 |

* cited by examiner

*Primary Examiner* — Glenn Dayoan
*Assistant Examiner* — Jason S Daniels
(74) *Attorney, Agent, or Firm* — Knobbe Martens Olson & Bear LLP (57) ABSTRACT

There is provided a tonneau cover apparatus including: a winding shaft that winds up a tonneau cover; an elongated shaped case that accommodates the winding shaft; support members provided at one end portion and another end portion of the case, and supporting the winding shaft; a retention member provided at the one end portion and/or the other end portion of the case and including an outer wall portion that covers the support member; and blocking portions provided at the support member and the retention member at the at least one end portion, the blocking portions being disposed at the inner side relative to the outer wall portion, and blocking movement of the retention member outward in the axial direction of the winding shaft from the engaging position by abutting against one another at the engaging position.

4 Claims, 7 Drawing Sheets

TONNEAU COVER APPARATUS

CROSS-REFERENCE TO RELATED APPLICATION

This application is based on and claims priority under 35 USC 119 from Japanese Patent Application No. 2011-007190 filed on Jan. 17, 2011, the disclosure of which is incorporated by reference herein.

BACKGROUND

1. Technical Field

The present invention relates to a tonneau cover apparatus that is equipped with a retention member movably provided at one or both of one end portion and another end portion of a case.

2. Related Art

In a tonneau cover apparatus according to Japanese Patent Application Laid-Open (JP-A) No. 2009-23438, a winding shaft, round which a tonneau cover is wound, is accommodated inside a tonneau cover case, and inner holders are mounted at each of two end portions of the tonneau cover case. The inner holders turnably support the winding shaft, and a protrusion is formed at an outer periphery portion of each inner holder.

Outer holders are also mounted at the two end portions of the tonneau cover case. The outer holders are mounted to cover the inner holders and to be movable in the axial direction of the winding shaft. Hence, by the outer holders being moved and the length direction length of the tonneau cover apparatus being shortened, the tonneau cover apparatus may be mounted in a vehicle.

A long hole is formed penetrating through an outer periphery wall of each outer holder. The protrusion of the inner holder is accommodated in the long hole, and movement of the outer holder is blocked by the protrusion abutting against an inner periphery face at one length direction end of the long hole. Thus, detachment of the outer holder from the tonneau case is prevented.

In this tonneau cover apparatus, as described above, the long holes are formed penetrating through the outer periphery walls of the outer holders and are exposed to the exterior. As a result, the external appearance of the tonneau cover apparatus is affected.

SUMMARY

In consideration of the circumstances described above, an object of the present invention is to provide a tonneau cover apparatus capable of preventing detachment of a retention member from a case, while restraining effects on the external appearance of the tonneau cover apparatus.

The first aspect of the present invention provides a tonneau cover apparatus including:

a winding shaft that winds up a tonneau cover by turning in a winding direction, the tonneau cover covering a luggage compartment of a vehicle;

an elongated shaped case that accommodates the winding shaft thereinside;

support members that are provided at one end portion and another end portion of the case, the support members turnably supporting the winding shaft;

a retention member provided at least one of the one end portion or the other end portion of the case, the retention member including an outer wall portion that covers the support member and being retained to be movable inward in an axial direction of the winding shaft from an engaging position; and a pair of blocking portions that are provided at the support member and the retention member at the at least one end portion, the blocking portions being disposed at the inner side relative to the outer wall portion, and blocking movement of the retention member outward in the axial direction of the winding shaft from the engaging position by abutting against one another at the engaging position.

In the tonneau cover apparatus of the first aspect of the invention, the winding shaft round which the tonneau cover is wound is accommodated inside the case, and the winding shaft is supported to be turnable by the support members provided at the one end portion and the other end portion of the case. The retention member is provided at either or both of the one end portion and the other end portion of the case. The retention member includes the outer wall portion that covers the support member, and the retention member is supported to be movable inward from the engaging position in the axial direction of the winding shaft.

The blocking portions are provided at both of the support member and the retention member. By the blocking portions abutting against one another at the engaging position, movement of the retention member outward from the engaging position in the winding shaft axial direction is blocked. Therefore, detachment of the retention member from the case is prevented.

The blocking portions are disposed at the inner side relative to the outer wall portion. Therefore, the blocking portions of the support member and the retention member are not exposed to the exterior by the outer wall portion of the retention member.

The second aspect of the present invention provides the tonneau cover apparatus according to the first aspect, further including:

a shaft portion that is provided at either one of the support member or the retention member, one of the blocking portions being formed at the shaft portion; and a shaft-receiving portion that is provided at the other of the support member or the retention member, the other of the blocking portions being formed at the shaft-receiving portion and the shaft portion being slidably inserted into the shaft-receiving portion.

In the tonneau cover apparatus of the second aspect of the invention, the shaft portion is slidably inserted into the shaft-receiving portion, one of the blocking portions is formed at the shaft portion, and the other of the blocking portions is formed at the shaft-receiving portion. Consequently, when the retention member moves inward in the winding shaft axial direction, the shaft-receiving portion guides the shaft portion.

The third aspect of the present invention provides the tonneau cover apparatus according to the second aspect, further including a long hole that is formed in the shaft-receiving portion, a length direction of the long hole being along the axial direction of the winding shaft, wherein one of the blocking portions is accommodated in the long hole to be movable in the axial direction of the winding shaft, and the other of the blocking portions is a face at one length direction end of the long hole.

In the tonneau cover apparatus of the third aspect of the invention, the long hole whose length direction is in the axial direction of the winding shaft is formed in the shaft-receiving portion, and the one blocking portion is accommodated in the long hole to be movable in the winding shaft axial direction. At the engaging position, the one blocking portion is abutted against one side face in the length direction of the long hole (i.e., the other blocking portion). Thus, movement of the retention member outward in the winding shaft axial direction is blocked.

The fourth aspect of the present invention provides the tonneau cover apparatus according to the second aspect or the third aspect, wherein the shaft portion and the shaft-receiving portion are disposed at a central portion of the retention member with respect to directions orthogonal to the axis direction.

In the tonneau cover apparatus of the fourth aspect of the invention, the shaft portion and the shaft-receiving portion are disposed at the central portion of the retention member. Therefore, the retention member may be more easily moved along the axial direction of the shaft portion and the shaft-receiving portion.

The fifth aspect of the present invention provides the tonneau cover apparatus according to any one of the second though fourth aspects, further including an urging member that is disposed between the support member and the retention member, the shaft portion and the shaft-receiving portion being inserted through the urging member, and the urging member urging the retention member outward in the axial direction of the winding shaft.

In the tonneau cover apparatus of the fifth aspect of the invention, the urging member is provided between the support member and the retention member, and the shaft portion and the shaft-receiving portion are inserted through the urging member. Therefore, the position of the urging member is specified by the shaft portion and the shaft-receiving portion, and slanting of the urging member is suppressed. In addition, urging force of the urging member acts along the axial direction of the shaft portion and the shaft-receiving portion.

According to the tonneau cover apparatus of the first aspect of the present invention, detachment of the retention member from the case may be prevented while effects on the external appearance of the tonneau cover apparatus are restrained.

According to the tonneau cover apparatus of the second aspect of the invention, when the retention member is moving inward in the axial direction of the winding shaft, the shaft portion and shaft-receiving portion may prevent detachment of the retention member from the case and the shaft-receiving portion may guide the shaft portion.

According to the tonneau cover apparatus of the third aspect of the invention, detachment of the retention member from the case may be prevented with a simple structure.

According to the tonneau cover apparatus of the fourth aspect of the invention, when the retention member is being moved inward in the axial direction of the winding shaft, the retention member may be moved smoothly.

According to the tonneau cover apparatus of the fifth aspect of the invention, mounting characteristics when the urging member is being mounted may be improved. In addition, when the retention member is being moved inward in the axial direction of the winding shaft, the retention member may be moved even more smoothly.

BRIEF DESCRIPTION OF THE DRAWINGS

Exemplary embodiments of the present invention will be described in detail based on the following figures, wherein.

DETAILED DESCRIPTION

Figure 1:
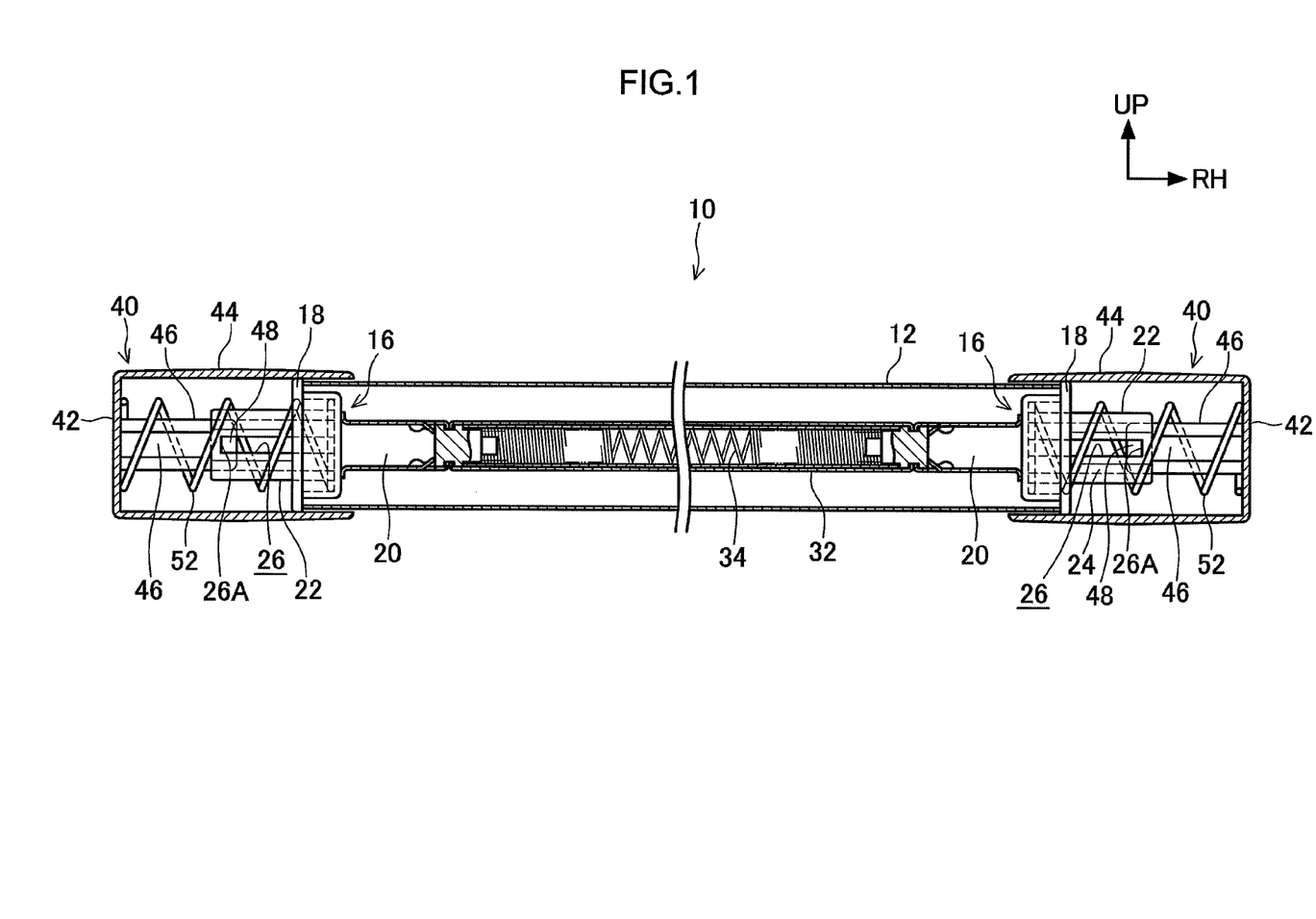
FIG. 1 is a sectional diagram in which a tonneau cover apparatus relating to an exemplary embodiment of the present invention is partially cut away.

FIG. 1 shows a sectional diagram of a tonneau cover apparatus 10 relating to an exemplary embodiment of the present invention. In the drawings, upward of the tonneau cover apparatus 10 is indicated by the arrow UP, rightward of the tonneau cover apparatus 10 is indicated by the arrow RH, and forward of the tonneau cover apparatus 10 is indicated by the arrow FR.

As illustrated in FIG. 1, a right end portion (one end portion) and a left end portion (other end portion) of the tonneau cover apparatus 10 are symmetrical structures about a left-right direction central portion of the tonneau cover apparatus 10. Accordingly, in regard to the right end portion and the left end portion of the tonneau cover apparatus 10, the right end portion of the tonneau cover apparatus 10 is described and no description is given of the left end portion of the tonneau cover apparatus 10.

Figure 2:
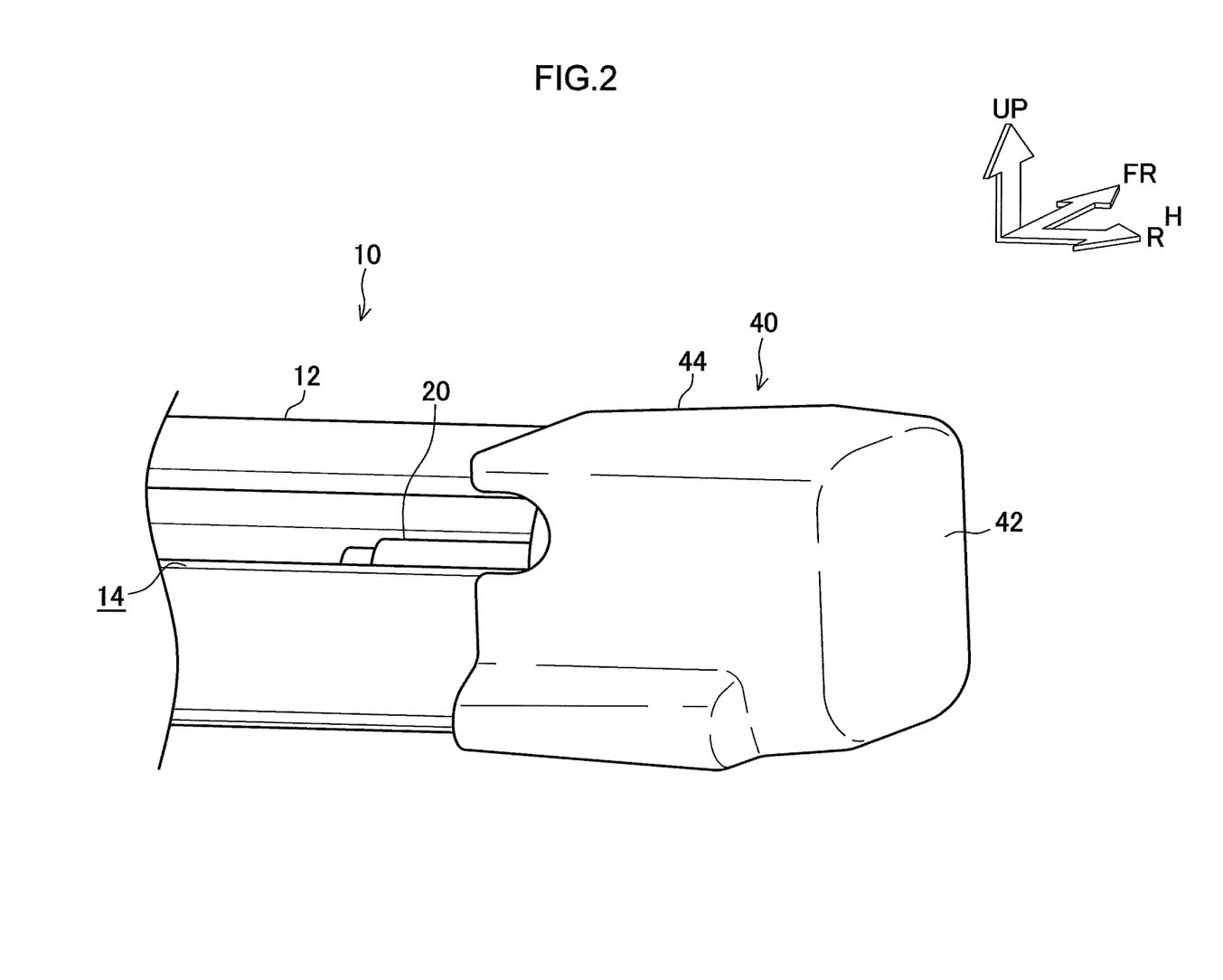
FIG. 2 is a perspective view illustrating a right end portion of the tonneau cover apparatus relating to the exemplary embodiment of the present invention.
Figure 3:
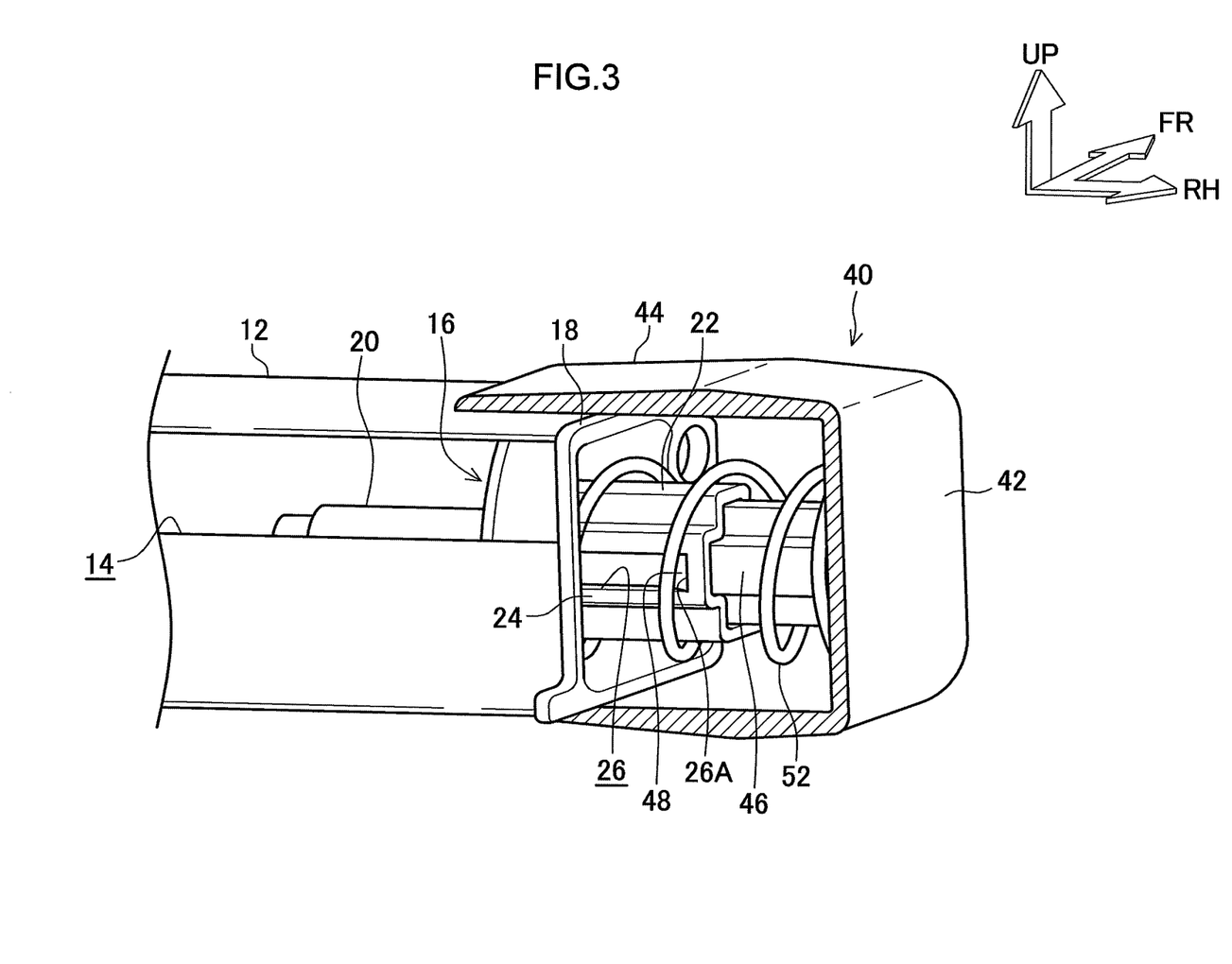
FIG. 3 is a partially cut away perspective diagram illustrating the right end portion of the tonneau cover apparatus relating to the exemplary embodiment of the present invention.

As illustrated in FIG. 1 to FIG. 3, the tonneau cover apparatus 10 is provided with a case 12 substantially in an elongated shaped tube shape. A cross-sectional shape of the case 12 is a substantially rectangular shape of which a portion is opened. A slit 14 is formed penetrating through a rear wall portion of the case 12. The slit 14 is arranged along the left-right direction.

Figure 4:
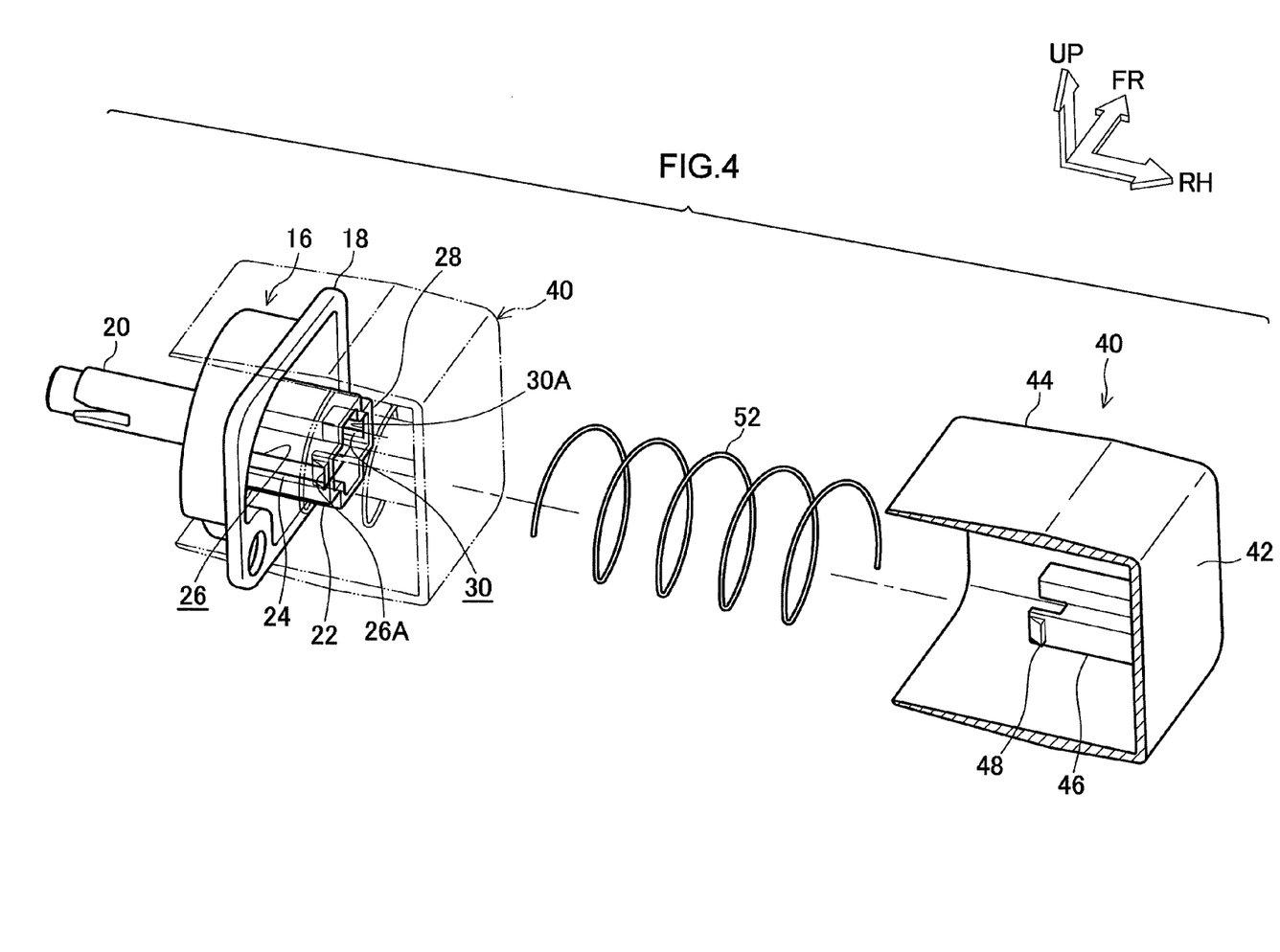
FIG. 4 is a perspective diagram illustrating a state in which the right end portion of the tonneau cover apparatus relating to the exemplary embodiment of the present invention is disassembled.
Figure 5:
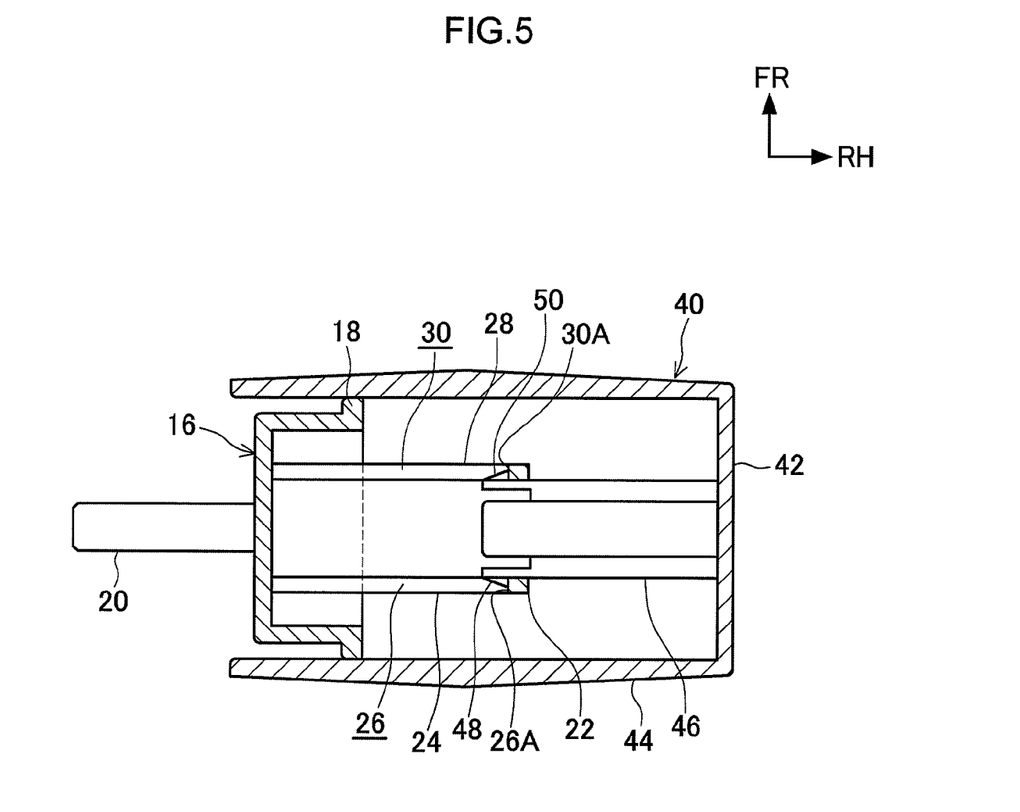
FIG. 5 is a sectional diagram in which an outer cover and an inner cover used in the exemplary embodiment of the present invention are partially cut away.

As illustrated in FIG. 4 and FIG. 5, an inner cover 16 made of resin is provided at the right end portion of the case 12. The inner cover 16, which has the shape of a rectangular tube with a floor, serves as a support member. The inner cover 16 is opened to rightward, and a flange 18 is provided at the opening portion of the inner cover 16. The inner cover 16 is inserted into the case 12 and, in a state in which the flange 18 is abutted against a right edge portion of the case 12, the inner cover 16 is mounted to the case 12. Thus, the right end portion of the case 12 is closed off by the inner cover 16. A support shaft 20 with a substantially circular rod shape is provided at a central portion of the floor wall of the inner cover 16. The support shaft 20 protrudes to leftward from the floor wall of the inner cover 16.

A tube portion 22 is provided at a central portion of the floor wall of the inner cover 16. The tube portion 22, which has the shape of a substantially cross-shaped hollow tube, serves as a shaft-receiving portion. The tube portion 22 protrudes to rightward from the floor wall of the inner cover 16. The tube portion 22 is opened to rightward and is disposed to be coaxial with the support shaft 20. A long hole 26 with a substantially rectangular shape is formed penetrating through a rear side wall 24 of the tube portion 22. The long hole 26 is arranged with the length direction thereof along the axial direction of the support shaft 20. A right side face of an inner periphery face of the long hole 26 is an abutting face 26A that serves as a blocking portion. Another substantially rectangular long hole 30 is formed penetrating through a front side wall 28 of the tube portion 22. The long hole 30 is arranged with the length direction thereof along the axial direction of the support shaft 20. A right side face of the inner side face of the long hole 30 is an abutting face 30A that serves as a blocking portion.

As illustrated in FIG. 1, a winding shaft 32 with a substantially circular tube shape is disposed inside the case 12. The winding shaft 32 is disposed to be coaxial with the support shaft 20 of the inner cover 16, and is supported at the support shaft 20 to be turnable. One end of a tonneau cover in the form of a sheet (not illustrated) is fixed to the winding shaft 32. When the winding shaft 32 is turned one way about the axis (hereinafter referred to as the winding direction), the tonneau cover is wound from the one end thereof onto an outer periphery portion of the winding shaft 32 in layers. Then, when the other end of the tonneau cover is pulled, the tonneau cover is pulled out through the slit 14 of the case 12 while the winding shaft 32 turns the other way about the axis (hereinafter referred to as the unwinding direction).

A coil spring 34 is disposed inside the winding shaft 32. One end of the coil spring 34 is anchored at the support shaft 20 of the inner cover 16, and the other end of the coil spring 34 is anchored at the winding shaft 32. The coil spring 34 urges the winding shaft 32 in the winding direction.

As illustrated in FIG. 1 to FIG. 5, an outer cover 40 made of resin is provided at the right end portion of the case 12. The outer cover 40 serves as a retention member. A floor wall 42 with a substantially rectangular plate shape is disposed at a rightward portion of the outer cover 40. The floor wall 42 serves as an outer wall portion. A peripheral wall 44 is provided integrally with an outer periphery portion of the floor wall 42. The peripheral wall 44, which has a substantially rectangular tube shape, also serves as the outer wall portion. The peripheral wall 44 protrudes leftward from the floor wall 42.

A boss 46 in the shape of a substantially cross-shaped hollow tube is provided at a central portion of the floor wall 42 of the outer cover 40. The boss 46 serves as a shaft portion. The boss 46 protrudes to leftward from the floor wall 42. The boss 46 is formed with an outer profile thereof being a little smaller than an inner profile of the inner periphery portion of the tube portion 22. A hook 48 is provided at a rearward portion of a distal end portion of the boss 46. The hook 48, which has a triangular shape in cross-section as viewed from above, serves as a blocking portion. The hook 48 protrudes rearward from the boss 46. A hook 50 is provided at a frontward portion of the distal end portion of the boss 46. The hook 50, which has a triangular shape in cross-section as viewed from above, serves as a blocking portion. The hook 50 protrudes forward from the boss 46.

The boss 46 is inserted into the tube portion 22 of the inner cover 16. The hook 48 and hook 50 of the boss 46 are accommodated in the long hole 26 and the long hole 30, respectively, of the tube portion 22. Thus, the boss 46 and the tube portion 22 are disposed at the inner side of the outer cover 40 relative to the floor wall 42 and peripheral wall 44 of the outer cover 40, and are prevented from being exposed to the exterior by the peripheral wall 44 and the floor wall 42.

The hook 48 and the hook 50 are abutted against the abutting face 26A of the long hole 26 and the abutting face 30A of the long hole 30, respectively. Thus, movement of the outer cover 40 in the left-right direction (i.e., in the outward direction of the winding shaft 32 axial direction) is blocked at a first position that serves as an engaging position. Thus, detachment of the outer cover 40 from the case 12 is prevented. Meanwhile, the boss 46 is slidable in the left-right direction at the inner periphery portion of the tube portion 22, and the hook 48 and the hook 50 are movable in the left-right direction in the long hole 26 and the long hole 30, respectively, of the tube portion 22. Thus, the outer cover 40 is constituted to be movable leftward from the first position (in the inward direction of the winding shaft 32 axial direction) and to be movable until a distal end portion of the tube portion 22 of the inner cover 16 is abutted against the floor face of the outer cover 40 (hereinafter, this position is referred to as a second position).

A substantially helical compression coil spring 52 spans between the floor wall of the inner cover 16 and the floor wall 42 of the outer cover 40. The compression coil spring 52 serves as an urging member. The tube portion 22 of the inner cover 16 and the boss 46 of the outer cover 40 are inserted through the inner side of the compression coil spring 52. The compression coil spring 52 urges the outer cover 40 rightward. Therefore, the outer cover 40 is retained at the first position by the urging force of the compression coil spring 52. If the outer cover 40 is moved leftward in opposition to the urging force of the compression coil spring 52, the outer cover 40 may move as far as the second position, as described above.

Next, operation of the present exemplary embodiment is described.

When a luggage compartment of a vehicle is to be covered using the tonneau cover apparatus 10, the tonneau cover apparatus 10 is mounted at the vehicle upper side of the luggage compartment. At this time, each outer cover 40 of the tonneau cover apparatus 10 is to be anchored in, for example, a recess formed in a side wall of the luggage compartment of the vehicle.

When the outer cover 40 of the tonneau cover apparatus 10 is being anchored in the recess, the outer cover 40 is gripped, and the outer cover 40 is moved from the first position to the second position (in the inward direction of the winding shaft 32 axial direction) in opposition to the urging force of the compression coil spring 52. At this time, the hook 48 and the hook 50 of the boss 46 of the outer cover 40 are moved in the long hole 26 and the long hole 30, respectively, of the tube portion 22. As a result, the length direction length of the tonneau cover apparatus 10 is shortened. In this state, a position of the outer cover 40 is matched with a position of the recess and, when the outer cover 40 is released, the outer cover 40 is moved rightward from the second position (outward in the winding shaft 32 axial direction) by the urging force of the compression coil spring 52. As a result, the tonneau cover apparatus 10 is mounted to the vehicle.

In this state, when the other end of the tonneau cover is pulled, the tonneau cover is pulled out through the slit 14 of the case 12. The other end of the pulled out tonneau cover is anchored at the vehicle. Thus, the tonneau cover covers the luggage compartment of the vehicle.

Then, when the tonneau cover apparatus 10 is to be removed from the vehicle, each outer cover 40 is gripped, and the outer cover 40 is moved leftward to the second position in opposition to the urging force of the compression coil spring 52. Thus, the length direction length of the tonneau cover apparatus 10 is shortened, and the anchoring between the outer cover 40 and the recess of the vehicle may be released.

Subsequently, when the outer cover 40 is released, the outer cover 40 is moved to the first position by the urging force of the compression coil spring 52. At this time, the hook 48 and the hook 50 of the boss 46 of the outer cover 40 are abutted against the abutting face 26A of the long hole 26 and the abutting face 30A of the long hole 30, respectively, of the tube portion 22. Consequently, rightward movement of the outer cover 40 is blocked and detachment of the outer cover 40 from the case 12 is prevented.

Herein, the tube portion 22 (the abutting face 26A and the abutting face 30A) and the boss 46 (the hook 48 and the hook 50) are disposed at the inner side of the outer cover 40 relative to the peripheral wall 44 and floor wall 42 of the outer cover 40. Therefore, the boss 46 (the hook 48 and the hook 50) and the tube portion 22 (the abutting face 26A and the abutting face 30A) are not exposed to the exterior by the peripheral wall 44 and the floor wall 42. Thus, detachment of the outer cover 40 from the case 12 may be prevented while effects on the external appearance of the tonneau cover apparatus 10 are restrained.

The tube portion 22 of the inner cover 16 is formed substantially in the shape of a cross-shaped tube and the boss 46 of the outer cover 40 is formed substantially in the shape of a cross-shaped tube, the long hole 26 and the long hole 30 are formed in the tube portion 22 of the inner cover 16 and the hook 48 and the hook 50 are formed at the boss 46 of the outer cover 40, and the boss 46 of the outer cover 40 is inserted inside the tube portion 22 and the boss 46 is made slidable in the left-right direction at the inner periphery portion of the tube portion 22. Therefore, the tube portion 22 may guide the boss 46 when the outer cover 40 moves from the first position toward the second position, and the boss 46 and the tube portion 22 prevent detachment of the outer cover 40 from the case 12.

The long hole 26 and the long hole 30 are formed to penetrate through the tube portion 22 in rectangular shapes, and the long hole 26 and the long hole 30 are arranged with the length directions thereof in the axial direction of the winding shaft 32. The right end face of the inner periphery face of the long hole 26 serves as the abutting face 26A and the right end face of the inner periphery face of the long hole 30 serves as the abutting face 30A, and the hook 48 and the hook 50 are abutted against the abutting face 26A and the abutting face 30A, respectively, at the first position. Therefore, detachment of the outer cover 40 from the case 12 may be prevented with a simple structure.

The tube portion 22 of the inner cover 16 and the boss 46 of the outer cover 40 are disposed at the central portion of the outer cover 40. Therefore, when the outer cover 40 is being moved from the first position toward the second position, the outer cover 40 may be moved along the axial direction of the tube portion 22 and the boss 46 easily. Therefore, the outer cover 40 may be moved from the first position to the second position smoothly.

The compression coil spring 52 spans between the floor wall of the inner cover 16 and the floor wall 42 of the outer cover 40, and the tube portion 22 and the boss 46 are inserted into the inside of the compression coil spring 52. Therefore, the position of the compression coil spring 52 may be specified by the tube portion 22 and the boss 46, and slanting of the compression coil spring 52 may be suppressed. As a result, mounting characteristics when the compression coil spring 52 is being mounted may be improved. In addition, because the urging force of the compression coil spring 52 acts along the axial direction of the tube portion 22 and the boss 46, the outer cover 40 may be moved from the first position to the second position even more smoothly.

In the present exemplary embodiment, the tube portion 22 is provided at the inner cover 16 and the boss 46 is provided at the outer cover 40. However, the boss 46 may be provided at the inner cover 16 and the tube portion 22 provided at the outer cover 40 instead. In this case, the left end face of the inner periphery face of the long hole 26 serves as the abutting face 26A and the left end face of the inner periphery face of the long hole 30 serves as the abutting face 30A.

In the present exemplary embodiment, the tube portion 22 of the inner cover 16 is formed substantially in the shape of a cross-shaped tube and the boss 46 of the outer cover 40 is formed substantially in the shape of a cross-shaped tube. However, shapes of the tube portion 22 and the boss 46 are not limited thus. For example, the tube portion 22 and the boss 46 may be formed in circular tube shapes, and may be formed in rectangular tube shapes.

VARIANT EXAMPLE 1

Figure 6:
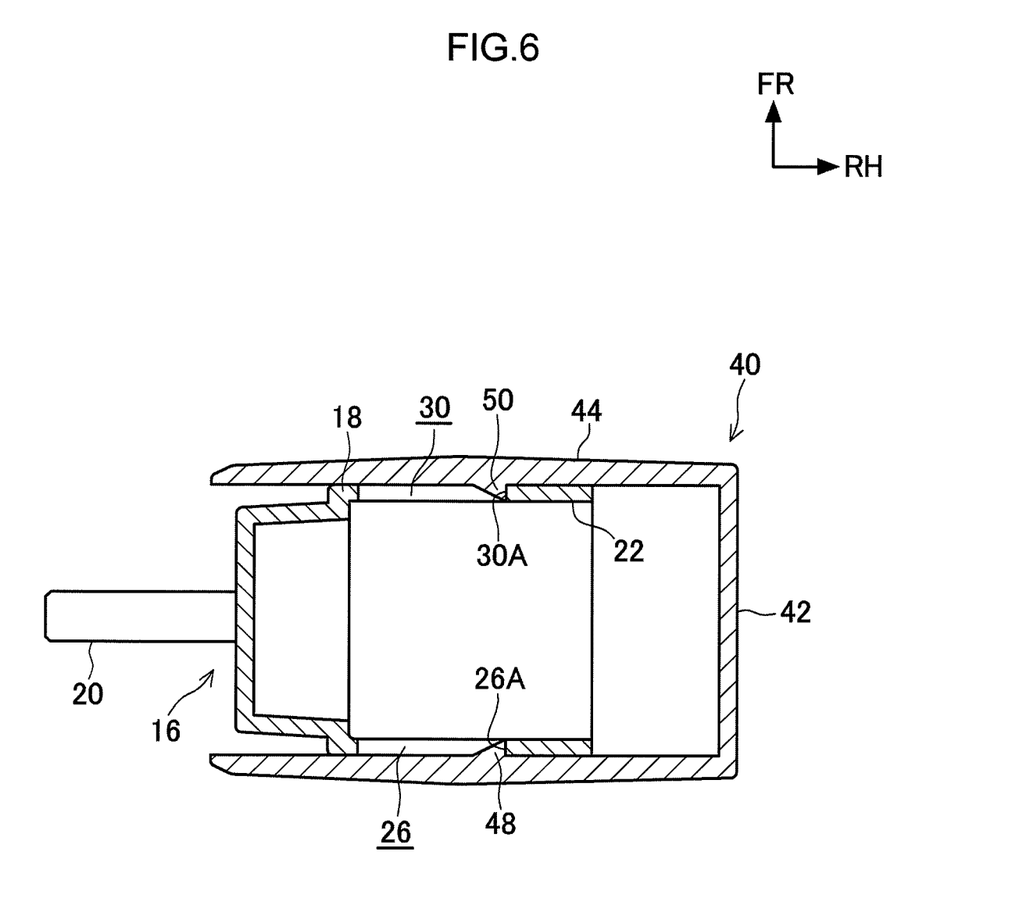
FIG. 6 is a sectional diagram in which an outer cover and an inner cover used in the exemplary embodiment of the present invention are partially cut away.

As illustrated in FIG. 6, in a variant example 1, the boss 46 is not formed at the outer cover 40. The hook 48 is formed at an inner periphery portion of the rear side wall of the peripheral wall 44 of the outer cover 40, and the hook 48 protrudes forward from the rear side wall of the outer cover 40. Meanwhile, the hook 50 is formed at an inner periphery portion of the front side wall of the peripheral wall 44 of the outer cover 40, and the hook 50 protrudes rearward from the front side wall of the outer cover 40.

The tube portion 22 is formed in a substantially rectangular tube shape at the outer periphery portion of the flange 18 of the inner cover 16, and the tube portion 22 is protruded rearward from the flange 18. The outer periphery portion of the tube portion 22 is slidable in the left-right direction at the inner periphery portion of the peripheral wall 44 of the outer cover 40. The long hole 26 is formed in the rear side wall of the tube portion 22, and the right side face of the inner periphery face of the long hole 26 serves as the abutting face 26A. The long hole 30 is formed in the front side wall of the tube portion 22, and the right side face of the inner periphery face of the long hole 30 serves as the abutting face 30A.

Thus, in this variant example 1 too, the hook 48, the hook 50 and the tube portion 22 are disposed at the inner side of the outer cover 40 relative to the peripheral wall 44 and floor wall 42 of the outer cover 40, and the hook 48, the hook 50 and the tube portion 22 are not exposed to the exterior by the peripheral wall 44 and the floor wall 42. Thus, detachment of the outer cover 40 from the case 12 may be prevented while effects on the external appearance of the tonneau cover apparatus 10 are restrained.

VARIANT EXAMPLE 2

Figure 7:
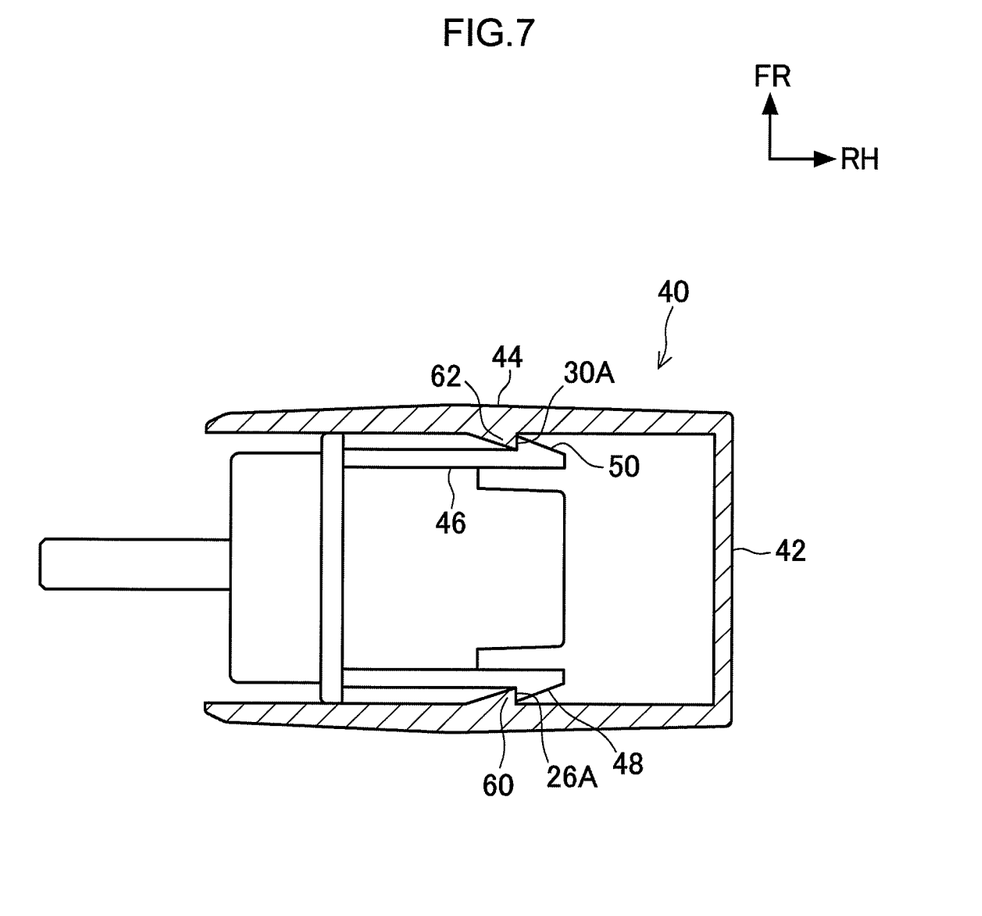
FIG. 7 is a sectional diagram in which an outer cover and an inner cover used in the exemplary embodiment of the present invention are partially cut away.

As illustrated in FIG. 7, in a variant example 2, the boss 46 is not formed at the outer cover 40. A protrusion portion 60, with a triangular shape in cross-section, is formed at an inner periphery portion of the rear side wall of the peripheral wall 44 of the outer cover 40. The protrusion portion 60 protrudes forward from the rear side wall of the peripheral wall 44, and a right side face of the protrusion portion 60 serves as the abutting face 26A. A protrusion portion 62, with a triangular shape in cross-section, is formed at an inner periphery portion of the front side wall of the peripheral wall 44 of the outer cover 40. The protrusion portion 62 protrudes rearward from the front side wall of the peripheral wall 44, and a right side face of the protrusion portion 62 serves as the abutting face 30A.

The tube portion 22 is formed at the inner cover 16. The outer cover 40 is formed, substantially in a rectangular tube shape, at the outer periphery portion of the flange 18 of the inner cover 16, and the boss 46 is protruded rightward from the flange 18. The hook 48 is formed at an outer periphery portion of the rear side wall of the boss 46, and the hook 48 is protruded rearward from the boss 46. The hook 50 is formed at an outer periphery portion of the front side wall of the boss 46, and the hook 50 is protruded forward from the boss 46.

Thus, in this variant example 2 too, the protrusion portion 60, the protrusion portion 62 and the boss 46 are disposed at the inner side of the outer cover 40 relative to the peripheral wall 44 and floor wall 42 of the outer cover 40, and the protrusion portion 60, the protrusion portion 62 and the boss 46 are not exposed to the exterior by the peripheral wall 44 and the floor wall 42. Thus, detachment of the outer cover 40 from the case 12 may be prevented while effects on the external appearance of the tonneau cover apparatus 10 are restrained.

In the present exemplary embodiment and variant example 1 and variant example 2, the outer covers 40 are movably retained at the right end portion (one end portion) and the left end portion (other end portion) of the tonneau cover apparatus 10 (the case 12) to be movable from the respective first positions thereof to the second positions (inward in the axial direction of the winding shaft 32). However, the outer cover 40 may be retained to be movable from the first position to the second position at only one or other of the right end portion and the left end portion of the tonneau cover apparatus 10. In this case, the outer cover 40 at the other of the right end portion and the left end portion may be constituted to be immovable by the compression coil spring 52 not being provided and the inner cover 16 and outer cover 40 being formed as an integral component.

What is claimed is:

1. A tonneau cover apparatus comprising:
   a winding shaft that winds up a tonneau cover by turning in a winding direction and having a rotational axis, the tonneau cover covering a luggage compartment of a vehicle;
   an elongated shaped case that accommodates the winding shaft thereinside;
   support members that are provided at one end portion and another end portion of the case, the support members turnably supporting the winding shaft;
   a retention member provided at least at one of the one end portion or the other end portion of the case, the retention member including an outer wall portion that covers the support member and being retained to be movable inward in an axial direction of the winding shaft from an engaging position;
   a pair of blocking portions that are provided at the support member and the retention member at the at least one end portion, the blocking portions being disposed at an interior side of the outer wall portion, and blocking movement of the retention member outward in the axial direction of the winding shaft from the engaging position by abutting against one another at the engaging position;
   a shaft portion that is provided at either one of the support member or the retention member, one of the blocking portions being formed at the shaft portion; and
   a shaft-receiving portion that is provided at the other of the support member or the retention member, the other of the blocking portions being formed at the shaft-receiving portion and the shaft portion being slidably inserted into the shaft-receiving portion,
   wherein the shaft portion and the shaft-receiving portion are separated from the interior side of the outer wall portion in a direction towards the rotational axis.

2. The tonneau cover apparatus according to claim 1, further comprising a long hole that is formed in the shaft-receiving portion, a length direction of the long hole being along the axial direction of the winding shaft, wherein one of the blocking portions is accommodated in the long hole to be movable in the axial direction of the winding shaft, and the other of the blocking portions is a face at one length direction end of the long hole.

3. The tonneau cover apparatus according to claim 1, wherein the shaft portion and the shaft-receiving portion are disposed at a central portion of the retention member with respect to directions orthogonal to the axis direction.

4. The tonneau cover apparatus according to claim 1, further comprising an urging member that is disposed between the support member and the retention member, the shaft portion and the shaft-receiving portion being inserted through the urging member, and the urging member urging the retention member outward in the axial direction of the winding shaft.

* * * * *